Sept. 6, 1966   N. D. LARKY   3,271,767
RADAR TRACKING
Filed Nov. 5, 1963

INVENTOR.
NORBERT D. LARKY
BY
ATTORNEYS

United States Patent Office 3,271,767
Patented Sept. 6, 1966

3,271,767
RADAR TRACKING
Norbert D. Larky, Rialto, Calif., assignor to the United States of America as represented by the Secretary of the Air Force
Filed Nov. 5, 1963, Ser. No. 321,654
7 Claims. (Cl. 343—17.1)

This invention relates to improved means for performing range-tracking and range-gating functions in radar receivers. In certain apparatus, for example tracking radar systems, it is desirable that the system be responsive to input signals representative of target replies within a specific, limited band of ranges. It is also desirable in many cases to create a "false" video signal which contains the range information of the true video and which is suitable for operation of subsequent circuitry within the system, and yet which does not suffer from the distortions in pulse shape often experienced by the true video due to atmospheric conditions, weak signal conditions, etc.

The above-mentioned desired effects are often achieved by means of pulse counting and/or electro-mechanical servomechanism circuitry, operating in the real time domain, and as such are subject to problems associated with requirements for precise pulse counting and measurement, as well as those of mechanical stability, electro-mechanical linearity, etc.

According to the teachings of the present invention means are provided for obtaining the functions of range-gating, false video, and coherence without incurring the difficulties attendant to prior-art means, by operating in the frequency domain rather than in the time domain.

More specifically, the invention involves, as a first step, the operation of a sweeping oscillator in the fashion of a linear sawtooth pulse generator, sweeping through a frequency range of, say, 10,000 kilocycles to 10,300 kilocycles, to establish a 300 kc. band sweep, corresponding to a target detection range of 300 miles; and as a second step, determining the range of a signal-reflecting target by measuring the instantaneous frequency registered by the sweeping oscillator at the moment of receipt of the reflected signal returning from such target. Thus, if the instantaneous frequency is found to be 10,100 kc., for example, at the instant of signal reception, the target is thereby identified as being 100 miles distant.

The features of the invention, both as to organization and method of operation, as well as objects and advantages thereof, will best be understood from the following description when read in conjunction with the accompanying drawings, in which.

Figure 3:
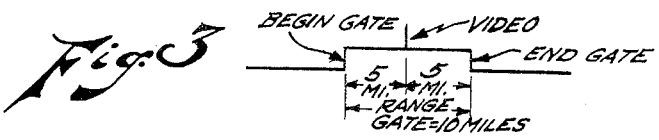
Figure 4:
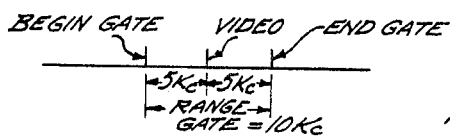
Figure 5:
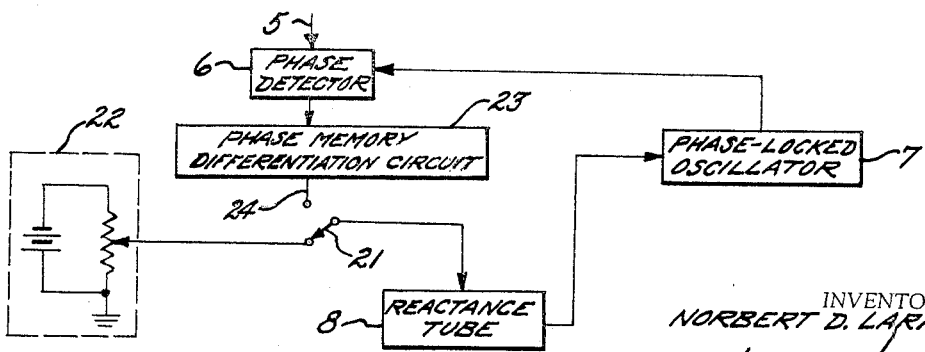

FIGURE 3 indicates the relationship of a video signal to its associated range gate in the time domain;

FIGURE 4 indicates the relationship of a video signal to its associated range gate in the frequency domain; and FIGURE 5 shows circuitry for performing manual range gate slewing and range velocity memory.

While these figures and the following description are in terms of a radar system, it is understood that the principles outlined are not necessarily limited to such a system.

Figure 1:
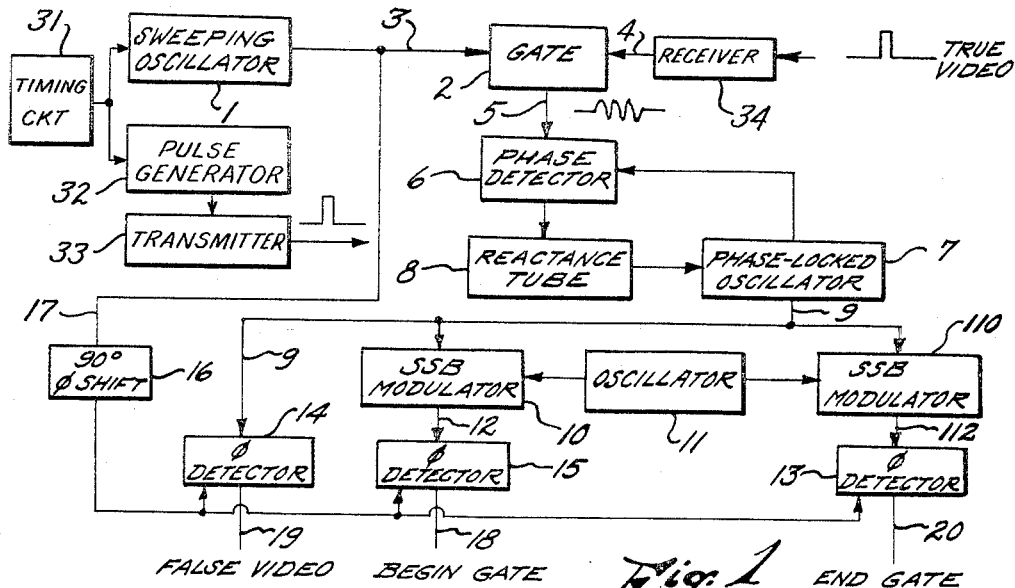
FIGURE 1 is a block diagram of the invention showing application to single pulse-repetition-frequency systems, with derivation of range gate and false video.
Figure 2:
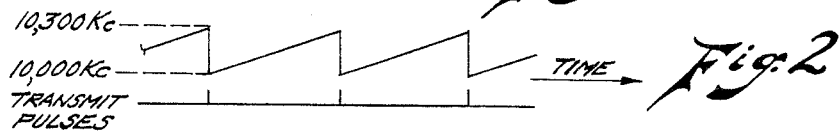
FIGURE 2 shows the relationship of a sawtooth-sweeping oscillator to transmitted radar pulses in a single-PRF system.

In FIGURE 1, a sweeping oscillator 1, which for purposes of this discusstion will be said to sweep in a linear-sawtooth manner, between the frequencies of 10,000 kc. and 10,300 kc., operates at a sweep rate which is synchronized with the pulse-repetition frequency (PRF). The nature of this sweep is shown in FIGURE 2. It may be considered that the reference frequency of sweeping oscillator 1 is 10,000 kc., corresponding to zero range, and that the limit of the sweep, which is 10,300 kc., corresponds to a range of 300 miles.

Referring again to FIGURE 1, timing circuit 31 synchronizes oscillator 1 and pulse generator 32 which is connected to transmitter 33 for transmission to the target. The output of sweeping oscillator 1 is fed to a gate circuit 2 via the lead 3. This gate circuit is designed so as to pass through it the signals of lead 3 only when it is activated by the true video signals connected to it via lead 4 from receiver 34. The output 5 of the gate circuit will thus be several cycles of the oscillations from sweeping oscillator 1, having a duration equal to the pulse width of the true video, a recurrent periodicity which is that of the true video (and accordingly that of the PRF), and a frequency and phase equal to the instantaneous frequency and phase of the sweeping oscillator 1. It is apparent that the frequency of the bursts of signal which appear on 5 is thus directly related to the time of occurrence of the true video signal, and therefore is directly representative of range. In the particular example cited here, 10,000 kc. would be representative of zero range, 10,100 kc. of 100 miles range, 10,150 kc. of 150 miles range, etc.

The signal appearing on 5 is used as one input to a phase detector 6, which has as its other input the output of a phase-locked oscillator 7. The oscillator 7, in this example, is capable of operation over the frequency range from 10,000 kc. to 10,300 kc., its exact frequency being controlled by a reactance tube 8 or other appropriate control device. The phase detector 6, oscillator 7, and reactance tube 8, when connected as shown in FIGURE 1 and supplied with input signal 5, comprise a phase-locking servo loop whereby the output signal of oscillator 7 will be identical in frequency and phase to that of the input signal 5. The output signal of oscillator 7, appearing on lead 9, is seen to be a continuous signal whose frequency is representative of the target range.

The functions of gate 2 and phase detector 6 in producing phase and frequency control of phase-locked oscillator 7 when operating in conjunction with reactance tube 8 may also be achieved according to the teachings of my Patent 2,879,328. Additionally, the functions of gate 2, phase detector 6, phase-locked oscillator 7, and reactance tube 8 may be achieved by means of a gated, burst synchronized oscillator of the type described in my Patent 2,879,329.

In order to provide the function of range-gating, it is necessary to provide signals which will enable (activate) the receiver circuitry prior to the time of reception of the true video signal, and disable (deactivate) the receiver circuitry thereafter. The total width of this gate, in miles, is not pertinent to this discussion, and it will be assumed that a total gate width of 10 miles is desired. The video signal, ideally, should be situated at the mid-point of this gate. This is illustrated in FIGURE 3.

The desired condition of having the range gate *always* centered about the video is achieved, as shown in FIGURE 1, as follows: The output signal 9 from phase-locked oscillator 7 is modulated in two single-sideband, suppressed carrier modulators 10 and 110 by a 5 kc. signal from a 5 kc. oscillator 11. These modulators are so designed that the output signal from modulator 10, appearing on lead 12, will consist of a lower sideband only, 5 kc. below the frequency of phase-locked oscillator 7, and the output signal from modulator 110, appearing on lead 112, will consist of an upper sideband only, 5 kc. above the frequency of phase-locked oscillator 7. Since the frequency of phase-locked oscillator 7 is representative of target range, the lower and upper sidebands will be representative of ranges 5 miles less than, and 5 miles greater than the target range. This is illustrated in FIGURE 4.

Note that the width of the range gate is determined solely by the frequency of oscillator 11. For example, if a 2 mile gate is desired then oscillator 11 would operate at 1 kc. Note also that in all cases the video will be *exactly* centered in the range gate.

Having performed all the foregoing operations in the frequency domain, it is now necessary to convert back to the time domain in order to implement use of the video and range gating signals. This is accomplished, as shown in FIGURE 1, by applying to one input of a series of phase detectors 13, 14, and 15 the signals of leads 12, 112, and 9. The signal from sweeping oscillator 1, which is present on lead 3, is passed via lead 17 to a 90 degree phase shift circuit 16 and then applied to the other input of phase detectors 13, 14, and 15. These phase detectors may be one of the double diode types familiar to those versed in the art, or alternatively may be of the type taught in my Patent 2,879,329. In the latter case, if the circuit of FIGURE 3 is adjusted so as to have the characteristics of FIGURE 5, where these figures refer to those of Patent 2,879,329, the 90 degree phase shift circuit 16 (FIGURE 1 of this patent) will not be required.

Consider now the operation of phase detectors 13, 14, and 15 when driven by the output signals from modulators 10 and 110 and 90 degree phase shifter 16. These phase detectors are responsive only when the signals of leads 12 and 17 or leads 112 and 17 or leads 9 and 17 are of identical frequency and phase. Accordingly, phase detector 15 will provide an output signal on line 18 at the time when the signal of sweeping oscillator 1, as present on lead 17, is in frequency and phase correspondence with the lower sideband signal at lead 12. Similarly, output signals will appear at leads 19 and 20, the output leads of phase detectors 14 and 13, as the frequency of sweeping oscillator 1 passes through the carrier frequency and upper sideband frequency signals on leads 9 and 112.

It is apparent that the signal at lead 19 will appear at a time corresponding to that of the returned true video signal, as referenced to the instantaneous frequency of sweeping oscillator 1, and will be indicative of target range. Similarly, the signals at leads 18 and 20 will appear at times corresponding to a range of five miles before the target and five miles beyond the target, respectively, and will thus be suitable for activating receiver gating circuitry.

Note that any non-linearities which may be present in the sweep characteristic of oscillator 1 do not introduce timing errors in the signals of leads 18, 19, and 20 because of the error-cancellation achieved by use of oscillator 1 as the source for both inputs to the phase detectors 13, 14, 15, one input being via lead 17 and the other input via leads 9, 12, 112, all of which are derived from the signal of lead 9.

Further consideration of the output signal of phase detector 14, as present on lead 19, shows that this signal is a "false video" signal, having the range information of the true video signal, but having none of the pulse-shape distortions which the true video signal might ordinarily suffer due to atmospheric conditions, weak signal conditions, etc.

The system as described above is clearly operative in the case of a stationary radar target. For an outbound moving target, it is only necessary to observe that the true video signals at lead 4 will occur at successively later points along the sweep characteristic of oscillator 1, corresponding to successively higher instantaneous frequencies. The output signal of phase-locked oscillator 7 will follow in frequency and phase correspondence, and thus the position of the true video signal at lead 19 and its accompanying Begin Gate and End Gate at leads 18 and 20 will move out in range.

The system of FIGURE 1 is particularly immune to noise, and highly tolerant of missing video replies, because of the inherent fly-wheel effect of phase-locked oscillator 7. The limiting factor in noise immunity achievement will be the time constant of the phase lock loop comprising elements 6, 7, and 8; this time constant should not be so great as to prevent the system from tracking at the desired maximum target velocity.

Manual slewing of the range gate, generally desired in radar systems, is readily possible with the system of FIGURE 1. As shown in FIGURE 5, it is only necessary to break the connection between phase detector 6 and reactance tube 8, and provide a switch 21 which can select either the signal from phase detector 6, for the condition of automatic tracking, or a suitable potential from the manually-adjustable potential source 22 for the condition of manual slew.

Additionally, the feature of a range velocity memory for the range gate is readily provided whereby, in the absence of video signals at lead 4, the range gate will continue to move at the velocity which obtained immediately prior to the loss of signals. Performance in this manner results from the use of differentiation circuitry 23 in FIGURE 5, which operates upon the output of phase detector 6 so as to provide a changing voltage at terminal 24 of switch 21 which is representative of the first differential, or velocity, of the target.

What is claimed is:
1. A radar apparatus for converting a true reflected video target pulse into a false video pulse comprising:
   (a) means for transmitting a signal pulse;
   (b) a sweeping oscillator synchronized with the transmitting means;
   (c) means for receiving a true video pulse reflected from the target;
   (d) means for generating a continuous signal having a frequency equal to that of the sweeping oscillator at the time of reception of the true video pulse;
   (e) and means for producing a false video pulse, the time of occurrence thereof being indicative of target range, the pulse-producing means being fed by the continuous signal generating means and the sweeping oscillator.

2. An apparatus according to claim 1 wherein the continuous signal generating means comprises: a first phase detector for receiving a gated input signal from the sweeping oscillator; a reactance tube fed by the first phase detector; and a phase-locked oscillator controlled by the reactance tube and connected to the first phase detector, with the first phase detector, the reactance tube, and the phase-locked oscillator forming a loop circuit.

3. An apparatus acording to claim 2 which further comprises means for generating signals for activation and deactivation of the receiving means including: a modulating oscillator; a first single sideband modulator fed by the phase-locked oscillator and the modulating oscillator with the first single sideband modulator having an output frequency equal to the sum of the frequencies of the phase-locked oscillator and the modulating oscillator; a second single sideband modulator fed by the phase-locked oscillator and the modulating oscillator with the second single sideband modulator having an output frequency equal to the difference of the frequencies of the phase-locked oscillator and the modulating oscillator; and means for converting the output frequency of the first and second single sideband modulators to a pulse signal for activation and deactivation of the receiving means.

4. An apparatus according to claim 3 wherein means for comparing comprises: a phase shifter connected to the sweeping oscillator and a second phase detector fed by the phase shifter and the phase-locked oscillator.

5. An apparatus according to claim 3 wherein the converting means comprises a third and fourth phase detectors fed by the first and second single sideband modulators respectively and each fed by the phase shifter.

6. An apparatus according to claim 3 which further comprises a means for manually slewing the range gates including a switch interposed between the first phase detector and the reactance tube and a source of variable potential capable of being connected to the reactance tube upon activation of the switch.

7. An apparatus according to claim 3 which further comprises a memory for range gating in the absence of a true video signal including a phase memory differentiating circuit interposed between the first phase detector and the reactance tube.

References Cited by the Examiner

UNITED STATES PATENTS

| | | | |
|---|---|---|---|
| 2,371,988 | 3/1945 | Granquist | 343—13 |
| 2,977,587 | 3/1961 | Herbst | 343—17.2 |

CHESTER L. JUSTUS, *Primary Examiner.*

LEWIS H. MYERS, *Examiner.*

R. E. KLEIN, R. D. BENNETT, *Assistant Examiners.*